(12) United States Patent
Forester

(10) Patent No.: US 6,789,967 B1
(45) Date of Patent: Sep. 14, 2004

(54) DISTAL CHORDING KEYBOARD

(76) Inventor: George Forester, 16580 Maple Cir., Lake Oswego, OR (US) 97034

( * ) Notice: Subject to any disclaimer, the term of this patent is extended or adjusted under 35 U.S.C. 154(b) by 126 days.

(21) Appl. No.: 10/057,591

(22) Filed: Jan. 25, 2002

Related U.S. Application Data

(60) Provisional application No. 60/265,722, filed on Feb. 2, 2001.

(51) Int. Cl.$^7$ .................................................. B41J 5/28
(52) U.S. Cl. ........................................ 400/489; 400/485
(58) Field of Search ............................. 400/489, 485, 400/486, 472; 361/680; 341/22, 21

(56) References Cited

U.S. PATENT DOCUMENTS

| | | |
|---|---|---|
| 600,119 A | 3/1898 | Cahill |
| 2,318,519 A | 5/1943 | Palanque |
| 3,022,878 A | 2/1962 | Seibel et al. |
| 3,034,717 A | 5/1962 | Werner |
| 3,428,747 A | 2/1969 | Alferieff |
| 4,005,388 A | 1/1977 | Morley et al. |
| 4,007,443 A | 2/1977 | Bromberg et al. |
| 4,324,976 A * | 4/1982 | Lapeyre .................. 235/145 R |
| 4,490,056 A | 12/1984 | Whitaker |
| 4,502,038 A | 2/1985 | Lowenthal et al. |
| 4,555,193 A | 11/1985 | Stone |
| 4,584,443 A | 4/1986 | Yaeger |
| 4,680,572 A | 7/1987 | Meguire et al. |
| 4,791,408 A | 12/1988 | Heusinkveld |
| 4,831,218 A | 5/1989 | Wright |
| 4,846,598 A | 7/1989 | Livits |
| 4,891,777 A | 1/1990 | Lapeyre |
| 4,913,573 A | 4/1990 | Retter |
| 4,971,465 A | 11/1990 | Hashimoto |
| 5,087,910 A | 2/1992 | Guyot-Sionnest |
| 5,128,672 A | 7/1992 | Kaehler |
| 5,189,416 A | 2/1993 | Estes |
| 5,267,181 A | 11/1993 | George |
| 5,270,709 A | 12/1993 | Niklsbacher |
| 5,432,510 A | 7/1995 | Matthews |
| 5,487,616 A | 1/1996 | Ichbiah |
| 5,493,654 A | 2/1996 | Gopher et al. |
| 5,515,305 A | 5/1996 | Register et al. |
| 5,552,782 A | 9/1996 | Horn |
| 5,642,108 A | 6/1997 | Gopher et al. |
| D381,017 S | 7/1997 | Burrell, IV |
| 5,754,655 A * | 5/1998 | Hughes et al. ................. 705/70 |
| 5,790,103 A | 8/1998 | Willner |
| 5,793,312 A | 8/1998 | Tsubai |

(List continued on next page.)

OTHER PUBLICATIONS

"Chord Keyboard With Case Lock and Chord Defi Features," Dec. 1978, IBM Technical Disclosure Bulletin, pp. 2929–2932, http://www.delphion.com/tdbs/tdb?&order=78A+07215.

(List continued on next page.)

*Primary Examiner*—Anthony H. Nguyen
(74) *Attorney, Agent, or Firm*—Blakely Sokoloff Taylor & Zafman LLP

(57) ABSTRACT

Apparatuses for a distal chording keyboard are described. Key configurations are selected based on the frequency of use of the characters. In one embodiment, a chording keyboard comprises two keypads, one for use with each of a user's hands, the keypads disposed on a distal side. In one embodiment, one of a user's hands provides alphanumeric input on one keypad, and the other hand provides cursor and special function control on another keypad.

17 Claims, 7 Drawing Sheets

U.S. PATENT DOCUMENTS

| | | | |
|---|---|---|---|
| 5,822,546 | A | 10/1998 | George |
| 5,828,323 | A | 10/1998 | Bartet |
| 5,924,803 | A | 7/1999 | Curtin, IV et al. |
| 5,982,303 | A | 11/1999 | Smith |
| 5,984,548 | A | 11/1999 | Willner et al. |
| 6,108,200 | A | 8/2000 | Fullerton |
| 6,164,853 | A | 12/2000 | Foote |
| 6,184,803 | B1 | 2/2001 | Burrell, IV |
| 6,184,804 | B1 | 2/2001 | Harrison |
| 6,232,892 | B1 | 5/2001 | Burrell, IV |
| 6,297,752 | B1 | 10/2001 | Ni |
| 6,510,325 | B1 * | 1/2003 | Mack et al. .............. 455/575.2 |
| 6,554,191 | B2 * | 4/2003 | Yoneya ................ 235/472.01 |

OTHER PUBLICATIONS

"One–Hand Tactile Data Transmitter," Nov. 1979, IBM Technical Disclosure Bulletin, pp. 2352–2354, http://www.delphion.com/tdbs/tdb?&order=79A+06936.

"Typamatic Feature for Chord Keyboard," May 1980, IBM Technical Disclosure Bulletin, pp. 5504–5505, http://www.delphion.com/tdbs/tdb?&order=80A+02743.

"Portable High Speed Keyboard," Dec. 1980, IBM Technical Disclosure Bulletin, pp. 3016–3018, http://www.delphion.com/tdbs/tdb?&order=80A+06802.

"Chord Keyboard," Dec. 1982, IBM Technical Disclosure Bulletin, pp. 3300–3302, http://www.delphion.com/tdbs/tdb?&order=82A+61863.

"Chording Keyboards," Oct. 2000, pp. 1–5, http://www.tifaq.com/keyboards/chording–keyboards.html.

"Keyboards Under Development," Oct. 2000, pp. 1–8, http://www.tifaq.com/keyboards/under–development.html.

"Dvorak Layout Diagram," Oct. 2000, pp. 1, http://www.mwbrooks.com/dvorak/layout.html.

"Chorded Keyboard," Nov. 2000, pp. 1–3, http://www.lsi.usp.br/~jecel/merlin4.7/chord.html.

"Merlin 4.7 Features," Nov. 2000, pp. 1–3, http://www.lsi.usp/br/~jecel/merlin4.7/features.html.

"ChordKey—A Chorded Keyboard Design," Nov. 2000, pp. 1–2, http://www.etla.net/~willey/projects/chordkey/.

* cited by examiner

DISTAL CHORDING KEYBOARD

DISTAL CHORDING KEYBOARD

This U.S. patent application claims the benefit of U.S. Provisional Application No. 60/265,722, filed Feb. 2, 2001.

FIELD OF THE INVENTION

The invention relates to data input devices. More particularly, the invention relates to distal chording keyboards.

BACKGROUND OF THE INVENTION

Data input devices generally represent a main component of a computer system. Through them a user can provide alphanumeric and special function input to provide user control and data to be stored and/or manipulated on the computer system. The present data input device standard is a combination of the QWERTY keyboard together with a mouse for cursor control. The QWERTY keyboard is named for its key configuration, with "Q", "W", "E", "R", "T", and "Y" being the letters from left to right on the top row of letter keys. The QWERTY keyboard has one key for each letter in the alphabet, the keys are typically labeled with the capital letter of the letter the key produces when depressed. The QWERTY keyboard also has keys for each number 0 through 9, as well as punctuation and control function keys. Most alphanumeric input is accomplished by a single key press on the keyboard. Some other input is accomplished by a combination key press of a control function key and an alphanumeric key. Cursor control may be provided by, for example, a mouse, trackball, cursor post, touchpad, etc.

One drawback to the QWERTY keyboard is that its key configuration is based in part on a negative application of frequency of use of alphanumeric characters in American English. The QWERTY keyboard was designed to be used in mechanical typewriters, where individual hammers would produce a character. Frequently used characters were spaced apart to prevent a proficient typist from jamming the hammers by typing too fast. However, this necessarily means that characters are not spaced on the keyboard for ease of use of a user.

Another drawback to the QWERTY keyboard is that the planar key layout has the potential to cause physical discomfort or even injury from extended use. This problem of ergonomics has been the motivation behind many efforts to create keyboards that better match the natural position of the hands. For example, QWERTY keyboards are produced that are split down the middle with the left-hands portion sloping down to the left, and the right-hand portion sloping down to the right. Other keyboards have been designed that dispose the keys on the distal side of the device (on the side of the keyboard facing away from the user) such that the fingers curve around the device to where the keys are located. However, these distal keyboards generally do not provide all the functionality possible with a QWERTY keyboard and cursor control combination that is standard to data input.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, numerous specific details are set forth by way of explanation to provide a thorough understanding of the invention. One skilled in the art will appreciate that the invention may be practiced without these specific details. In other instances, certain structures and devices are shown in block diagram form to avoid obscuring the invention.

Reference in the specification to an "embodiment" means that a particular feature, structure, or characteristic described is included in at least one embodiment of the invention. Thus, references in the specification to various "embodiments" do not all necessarily refer to the same embodiment.

Briefly, apparatuses for a distal chording keyboard are described. Key configurations are selected based on the frequency of use of the characters represented by the keys on the keyboard. In one embodiment, a chording keyboard comprises two keypads, one for use with each of a user's hands, the keypads disposed on a distal side. In one embodiment, one of a user's hands provides alphanumeric input on one keypad, and the other hand provides cursor and special function control on another keypad.

Figure 1:
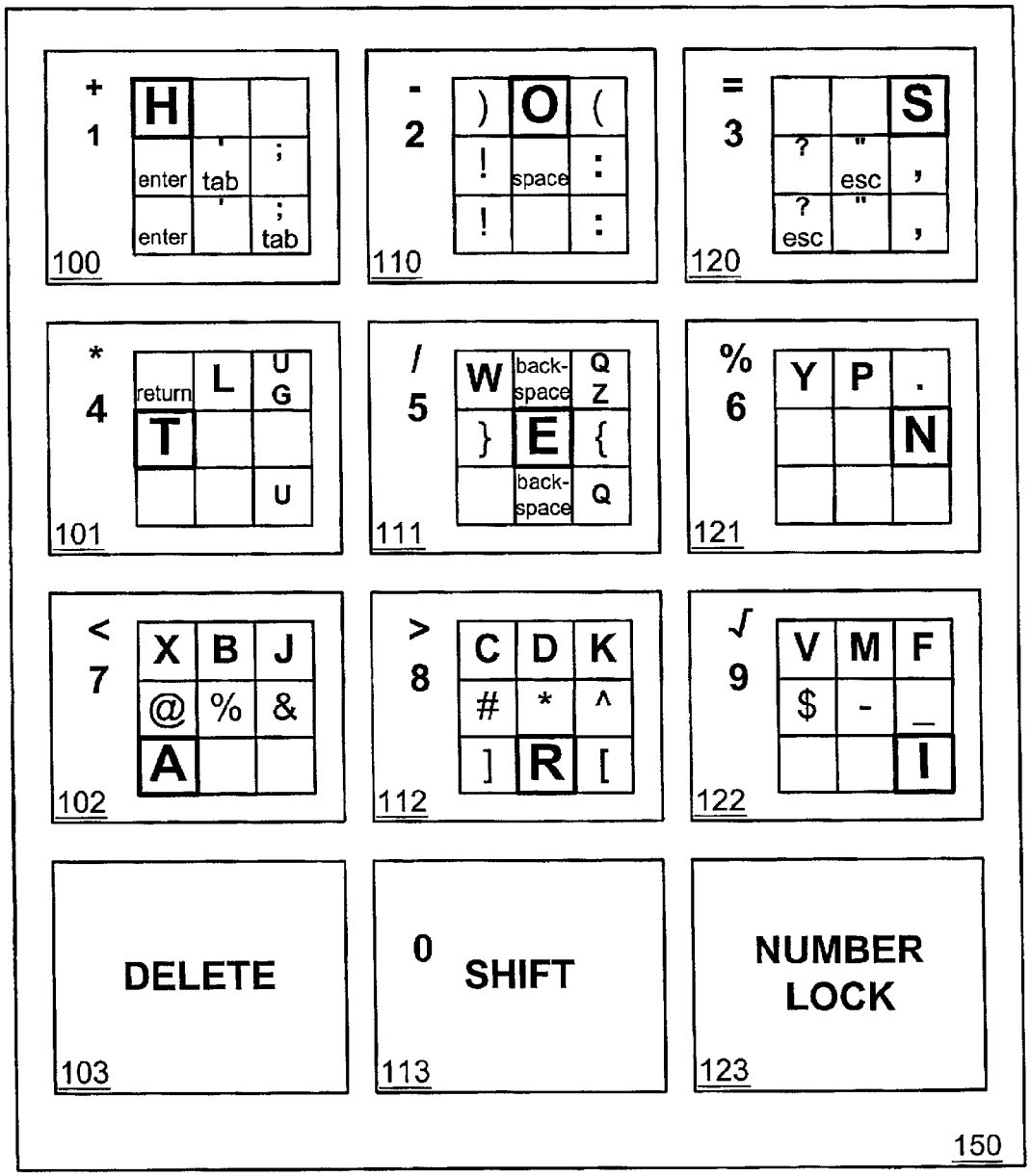
FIG. 1 is one embodiment of a layout of a configuration of a chording keypad.

FIG. 1 is one embodiment of a layout of a configuration of a chording keypad. Keypad 150 represents one layout configuration of a 12-key chorded keyboard. Producing alphanumeric characters with the keys on keypad 150 combines the concepts of a traditional, single-press for a single character keyboard, such as a QWERTY keyboard, and a musical chord on a musical instrument, such as a clarinet. Keypad 150 includes three columns of keys, namely, 100–103, 110–113, 120–123. Generally, each key 100–102, 110–112, and 120–122 produces one alphanumeric character by a single key press, and produces other alphanumeric characters in combination with other keys through simultaneous, substantially simultaneous, or sequential key presses.

For purposes of this document, the keys of keypad 150 are laid out in a horizontal-vertical key configuration, much like a system on an x-y Cartesian coordinates axis. The key numbering has been chosen to be consistent with this axis convention, such that the key at coordinates (0,0) is key 100, the key at (0,2) is key 102, and the key at (2,1) is key 121, etc. Thus, each set of coordinates on the axis corresponds to a key. This numbering convention is used to simplify the description of the invention, and is not necessary to practice the invention.

Each of the keys 100–102, 110–112, and 120–122 of FIG. 1 contains a three by three (3×3) grid representing the top three rows of the key configuration of keypad 150. The 3×3 grid has one bolded box, which is the primary "label" of the key. The label is much like the labeling of keys on a QWERTY keyboard, where a key is labeled with a letter name, and a key press produces the lower case letter corresponding to the key label. For example, pressing the key "E" on a QWERTY keyboard will produce the character "e", and pressing key "E" with the Shift key will produce the character "E". In similar fashion, in one embodiment, pressing key 111 labeled "E" will produce the character "e" when pressed alone, and the character "E" when pressed in combination with Shift key 113. Thus, keyboard represented by keypad 150 can be referred to as a "HOSTENARI" keyboard. HOSTENARI, being the labels, from left to right, from top to bottom of the primary character, of the first three rows of keys.

The positions on the 3×3 grid that are not bolded show the labels comprised by the key corresponding to the non-bolded set of coordinates in combination with the bolded key position. For example, in one embodiment, key 111 in combination with the key at coordinates (0,0) represents the character label "W". Thus, key 111 pressed in combination with key 100 produces the character "w", and the character "W" when Shift key 113 is pressed in combination with key 111 and key 100. Likewise, pressing key 111 with key 101 produces the character "}".

Some keys contain a 3×3 grid with the same character label at more than one set of coordinates, showing the label represented by the bolded key in combination with each key corresponding to a set of coordinates with the character label. Bach key corresponding to a set of coordinates with the character label must be pressed in combination with the bolded key to produce the character. For example, in one embodiment, key 110 in combination with the keys corresponding to the coordinates (0,1) and (0,2) comprises the label "!". Thus, to produce the character "!", key 110 is pressed in combination with keys 101 and 102.

Some keys contain a 3×3 grid with two character labels at the same set of coordinates. This signifies that the bolded key represents a first label when used in combination with only the key corresponding to the particular set of coordinates, and a second label when used in combination with the key corresponding to the particular coordinates and another set of coordinates containing the same label. For example, in one embodiment, key 111 in combination with the key corresponding to coordinates (2,0) comprises the label "Z", which produces the characters "z" and "Z". However, key 111 in combination with the key corresponding to coordinates (2,0) and the key corresponding to coordinates (2,2) represents the label "Q", such that pressing key 111, key 120, and key 122 in combination produces the characters "q", and "Q" in combination with Shift key 113.

Thus, in one embodiment, key 111 produces the character "e" when pressed alone. The combination of key 111 pressed with key 100 produces the character "w". Likewise, the combination of key 111 pressed with key 101 produces the character "}", key 111 with key 121 produces the character "{", and key 111 with key 120 produces the character "z". The combination of key 111 pressed with keys 120 and 122 produces the character "q". The other keys shown in one embodiment of keypad 150 work in a substantially similar manner.

In one embodiment, a Caps Lock state is activated by pressing Shift key 113 in combination with Num Lock key 123. In the Caps Lock state, a press of a key or combination of keys labeled with a letter will produce the capital of the letter, rather than needing to press the Shift key in combination with the key combination corresponding to the letter for each letter.

In one embodiment, a Number Lock state is activated by pressing Num Lock key 123. Each of the keys 100–102, 110–112, and 120–122 (those corresponding to the 3×3 grid) contains a number and a symbol of a mathematical operator to the left of the 3×3 grid included in that key. In the Number Lock state, the keys produce the numerals shown to the left of the grid. Specifically, key 100 produces "1", key 110 produces "2", and so forth. Shift key 113 produces "0" when the Number Lock state is active. Also, in one embodiment, pressing key 111, key 112, and key 113 in combination configures the keys of keypad 150 to produce the mathematical operators. This configuration stays active for one key press. Thus, if the Number Lock state is active, pressing key 111, key 112, and key 113 in combination configures keypad 150 to produce the mathematical operator on the next key press. Once a key is pressed, the mathematical operator status will deactivate. For example, pressing key 111, key 112, and key 113 in combination and then pressing key 100 again (the Number Lock is still active) will now produce a "1", and not another "+".

The following table summarizes the chording of standard ASCII characters for one embodiment of a key configuration of keypad 150. Note that other configurations for chording standard ASCII characters may also be used

| Character | ASCII Dec Code | Key Configuration |
| --- | --- | --- |
| (space) | 32 | 110, 111 |
| (backspace) | 8 | 110, 111, 112 |
| (delete) | 127 | 103 |
| (esc) | 27 | 120, 111, 102 |
| a | 97 | 102 |
| b | 98 | 102, 110 |
| c | 99 | 112, 100 |
| d | 100 | 112, 110 |
| e | 101 | 111 |
| f | 102 | 122, 120 |
| g | 103 | 101, 120 |
| h | 104 | 100 |
| i | 105 | 122 |
| j | 106 | 102, 120 |
| k | 107 | 112, 120 |
| l | 108 | 101, 110 |
| m | 109 | 122, 110 |
| n | 110 | 121 |
| o | 111 | 110 |
| p | 112 | 121, 110 |
| q | 113 | 111, 120, 122 |
| qu | N/A | 101, 111, 120, 122 |
| r | 114 | 112 |
| s | 115 | 120 |
| t | 116 | 101 |
| u | 117 | 101, 120, 122 |
| v | 118 | 122, 100 |
| w | 119 | 111, 100 |
| x | 120 | 102, 100 |
| y | 121 | 121, 100 |

-continued

| Character | ASCII Dec Code | Key Configuration |
|---|---|---|
| z | 122 | 111, 120 |
| A | 65 | 113, then 102 |
| B | 66 | 113, then 102, 110 |
| C | 67 | 113, then 112, 100 |
| D | 68 | 113, then 112, 110 |
| E | 69 | 113, then 111 |
| F | 70 | 113, then 122, 120 |
| G | 71 | 113, then 101, 120 |
| H | 72 | 113, then 100 |
| I | 73 | 113, then 122 |
| J | 74 | 113, then 102, 120 |
| K | 75 | 113, then 112, 120 |
| L | 76 | 113, then 101, 110 |
| M | 77 | 113, then 122, 110 |
| N | 78 | 113, then 121 |
| O | 79 | 113, then 110 |
| P | 80 | 113, then 121, 110 |
| Q | 81 | 113, then 111, 120, 122 |
| Qu | N/A | 113, then 101, 111, 120, 122 |
| R | 82 | 113, then 112 |
| S | 83 | 113, then 120 |
| T | 84 | 113, then 101 |
| U | 85 | 113, then 101, 120, 122 |
| V | 86 | 113, then 122, 100 |
| W | 87 | 113, then 111, 100 |
| X | 88 | 113, then 102, 100 |
| Y | 89 | 113, then 121, 100 |
| Z | 90 | 113, then 111, 120 |
| 0 | 48 | 123, then 113 |
| 1 | 49 | 123, then 100 |
| 2 | 50 | 123, then 110 |
| 3 | 51 | 123, then 120 |
| 4 | 52 | 123, then 101 |
| 5 | 53 | 123, then 111 |
| 6 | 54 | 123, then 121 |
| 7 | 55 | 123, then 102 |
| 8 | 56 | 123, then 112 |
| 9 | 57 | 123, then 122 |
| ! | 33 | 110, 101, 102 |
| " | 34 | 120, 111, 112 |
| # | 35 | 112, 101 |
| $ | 36 | 122, 101 |
| % | 37 | 102, 111 |
| & | 38 | 102, 121 |
| ' | 39 | 100, 111, 112 |
| ( | 40 | 110, 120 |
| ) | 41 | 110, 100 |
| * | 42 | 112, 111 |
| + | 43 | 113, 111, 102 |
| , | 44 | 120, 121, 122 |
| - | 45 | 122, 111 |
| . | 46 | 121, 120 |
| / | 47 | 113, 101, 122 |
| : | 58 | 110, 121, 122 |
| ; | 59 | 100, 121, 122 |
| < | 60 | 123, 102 |
| = | 61 | 113, 111, 112 |
| > | 62 | 123, 112 |
| ? | 63 | 120, 101, 102 |
| @ | 64 | 102, 101 |
| [ | 91 | 112, 122 |
| \ | 92 | 113, 121, 102 |
| ] | 93 | 112, 102 |
| ^ | 94 | 112, 121 |
| _ | 95 | 122, 121 |
| ` | 96 | 113, 101, 102 |
| { | 123 | 111, 121 |
| \| | 124 | 113, 121, 112 |
| } | 125 | 111, 101 |
| ~ | 126 | 113, 101, 112 |

Note that the table above lists the technique of producing a capital letter to be to press Shift key 113 and then pressing the key combination to produce the capital letter. While pressing Shift key 113 prior to a key will produce a capital letter for the next letter combination, pressing Shift key 113 and Number Lock key 123 will activate Caps Lock which will produce all capitals until Caps Lock is deactivated by pressing Shift key 113 and Number Lock key 123 again. Also note that the table above is an illustration of one keypad configuration, and any number of other configurations may also be employed.

In one embodiment, keypad 150 is incorporated into a standalone keyboard device. In another embodiment, keypad 150 is incorporated into a wireless device, supporting extended-text-messaging on the device. A wireless device may be a cell phone, a PDA (Personal Digital Assistant), a handheld computer, or other compact and/or portable electronic device. For example, a cell phone normally contains a twelve-key keypad similar in button placement to keypad 150. In one embodiment, such a cell phone contains a configuration switch that allows a user to switch the keypad functionality from normal cell phone use to functionality similar to that taught above for keypad 150. Such a device may contain a display on the side opposite the side disposing the keypad (the proximal side for purposes of the twelve-key keyboard), or a connector to allow for such a display. The display or connector for a display may also be located on another part of such a device. Thus, a normal cell phone would contain an input device to enable extended text messaging functionality.

In one embodiment, keypad 150 is used in combination with another, similar keypad. In this embodiment, over 5000 different characters can be produced by using the keypads in combination. Therefore, a combination keyboard can be configured to function for various different languages, potentially employing various different alphabets. Thus, the most-used character layout will be different for different languages, even though those languages may use the same basic characters to form their words. Software solutions, for example, could enable keypad 150 to be configured with a different layout than that showed in the above table, depending upon the frequency of characters occurring in the language that is configured on keypad 150. Likewise, characters that are shown in FIG. 1 may be removed for certain languages, or additional character combinations added, based upon the need and frequency of character use in a particular language.

Figure 2:
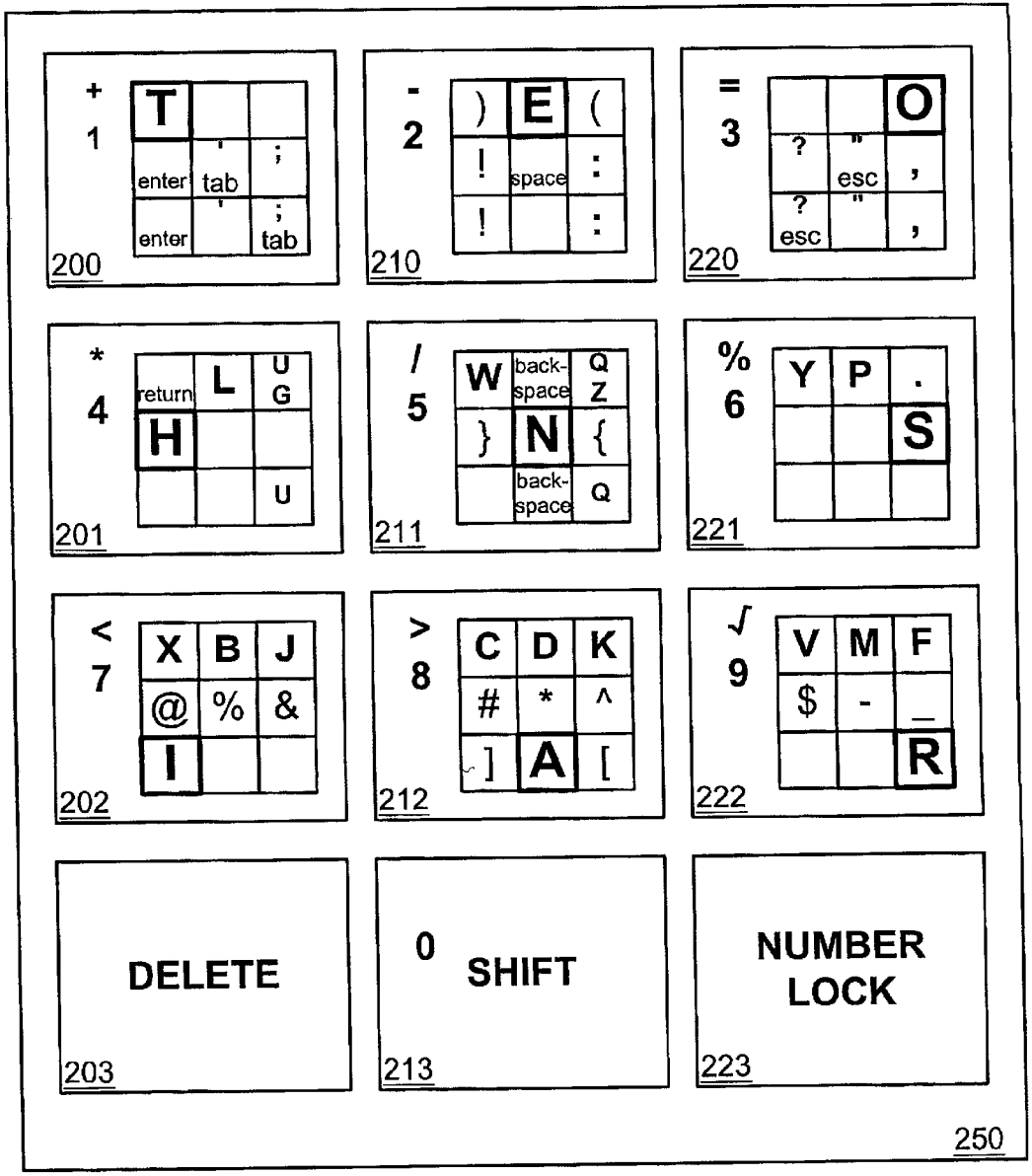
FIG. 2 is another embodiment of a layout of a configuration of a chording keypad.

FIG. 2 is another embodiment of a layout of a configuration of a chording keypad. Keypad 250 is substantially the same as keypad 150 of FIG. 1. Keypad 250 is one example of a different chording configuration for the keys of keypad 150, where the nine characters ("h", "o", "s", "t", "e", "n", "a", "r", and "i") selected based on the frequency of use are arranged differently from those of keypad 150 of FIG. 1. Thus, certain key presses result in different character output. For example, pressing key 200 of keypad 250 produces "t". By extension, a keypad configuration could be made so that different chords would produce different characters than those shown in FIG. 1.

The table below summarizes the main differences between keypad 250 and keypad 150:

| Character | ASCII Dec Code | Key Configuration |
|---|---|---|
| a | 97 | 212 |
| e | 101 | 210 |
| h | 104 | 201 |
| i | 105 | 202 |
| n | 110 | 211 |
| o | 111 | 220 |

-continued

| Character | ASCII Dec Code | Key Configuration |
|---|---|---|
| r | 114 | 222 |
| s | 115 | 221 |
| t | 116 | 200 |
| A | 65 | 213, then 212 |
| E | 69 | 213, then 210 |
| H | 72 | 213, then 201 |
| I | 73 | 213, then 202 |
| N | 78 | 213, then 211 |
| O | 79 | 213, then 220 |
| R | 82 | 213, then 222 |
| S | 83 | 213, then 221 |
| T | 84 | 213, then 200 |

Figure 3:
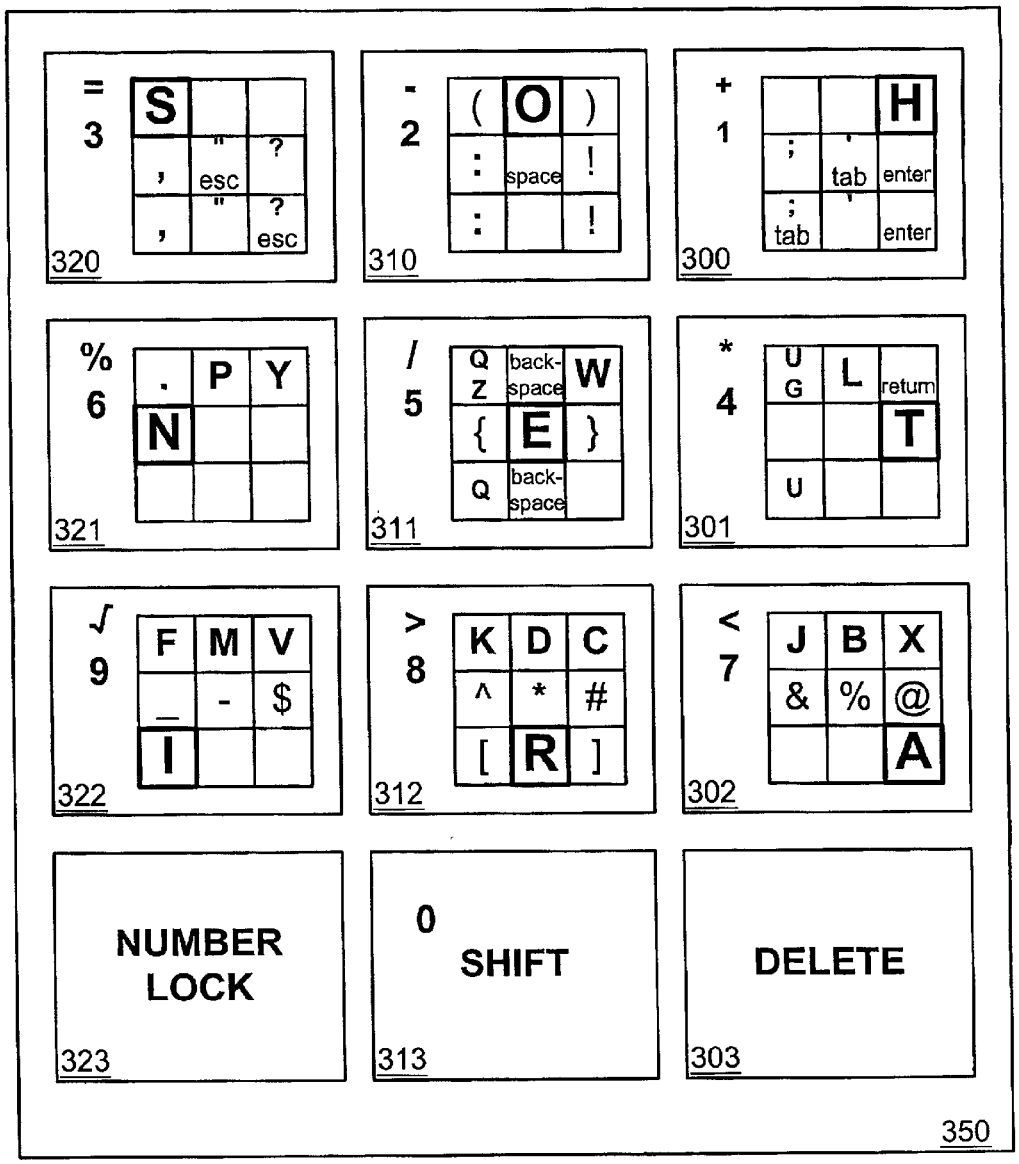
FIG. 3 is another embodiment of a layout of a configuration of a chording keypad.

FIG. 3 is another embodiment of a layout of a configuration of a chording keypad. Keypad 350 is a mirror image of keypad 150 of FIG. 1. This reflects the idea that a keypad configuration could be selected primarily for left-handed use, and another keypad configuration primarily for right-handed use. For example, in one embodiment, keypad 150 is intended primarily for left-handed use, and its mirror image, keypad 350, would be primarily intended for right-handed use. Thus, while keypad 350 is a mirror image of keypad 150, the coordinate system of the keys of keypad 350 has been similarly mirrored to emphasize that similar right-hand finger motion on keypad 350 will produce similar results as left-hand finger motion on keypad 150. For example, pressing the upper-most key on the edge closest to the fingers when the fingers of the left hand are curving around from the proximal side on keypad 150 will press key 120, which produces an "s". Similarly, pressing the upper-most key on the edge closest to the fingers when the right hand is curving around from the proximal side on keypad 350 will press key 320, producing an "s". In one embodiment, keys 303, 313, and 323 are not mirrored from the position they have on keypad 150 of FIG. 1, such that key 303 would be directly below key 322, and key 323 would be directly below key 302.

In one embodiment, a device employs a single keypad, and a configuration according to keypad 150 or keypad 350 can be selected by operation of a switch. For example, a device with a twelve-key keypad could be configured to be used like keypad 150 with the left hand, and then operating a physical switch would configure the keypad to be used like keypad 350 with the right hand. In another example, a combination of key presses operates a software switch between the two keypad configurations.

Figure 4A:
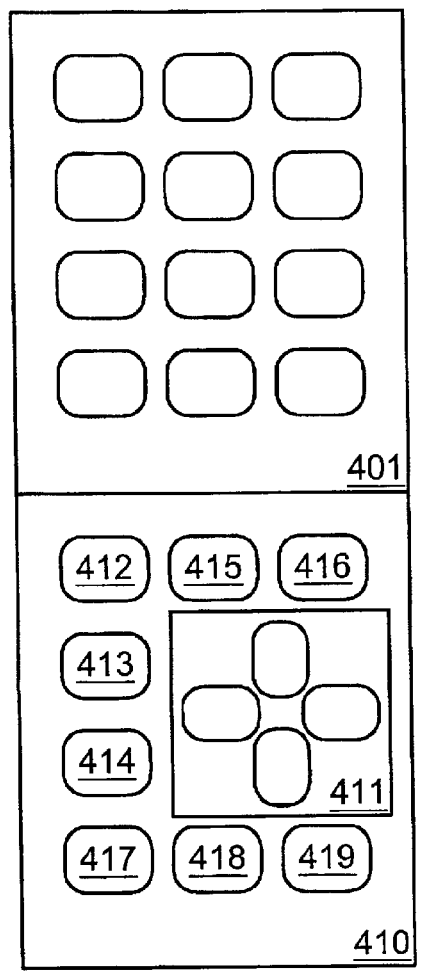
FIG. 4A is one embodiment of a data input device configuration utilizing one hand for alphanumeric data input and the other hand for control function input.
Figure 4B:
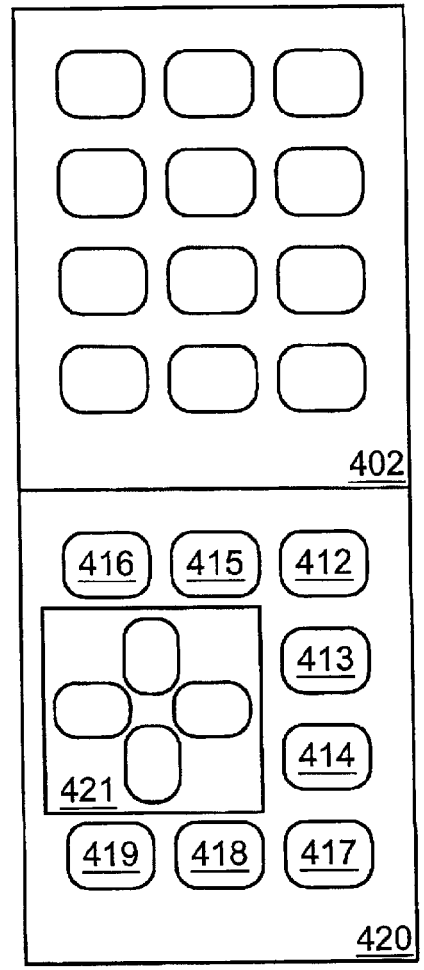
FIG. 4B is another embodiment of a data input device configuration utilizing one hand for alphanumeric data input and the other hand for control function input.

FIG. 4A is one embodiment of a data input device configuration utilizing one hand for alphanumeric data input and the other hand for control function input. FIG. 4B is another embodiment of a data input device configuration similar to FIG. 4A. In one embodiment, keypad 401 comprises a twelve-key chording keyboard configuration to allow alphanumeric character input. The key configuration of keypad 401 may be selected by frequency of use. For example, the letters "h", "o" "s", "t", "e", "n", "a", "r", and "i" make up approximately 70% of characters occurring, by frequency, in American English.

In one embodiment, keypad 402 is similar to keypad 401, providing the same alphanumeric data input functionality. However, in one embodiment, the key configuration of keypad 402 is a mirror image of the key configuration of keypad 401. Thus, for example, one configuration could be used primarily for left-handed use, and the mirror image primarily for right-handed use. This would enable certain fingering motions by one hand to produce similar results (in terms of alphanumeric input) on one keypad as would be produced by similar fingering motion by the other hand on the mirror image keypad. In alternate embodiments, keypad 402 can have a different configuration.

Keypad 410 provides control functionality. Control functionality may be, for example, function keys and cursor control. In one embodiment, keypad 410 contains cursor control 411. In one embodiment, cursor control 411 comprises direction keys to control cursor movement For example, one key to move the cursor to the left, one to the right, one up, and one down. A combination of keys could produce diagonal motion of the cursor. In an alternate embodiment, cursor control 411 comprises a round composite key that controls movement based on what part of the edge of the circular key is pressed Thus, the single key would work in a similar fashion to the four separate keys described above. In alternate embodiments, cursor control 411 comprises a touchpad, a trackball, or a cursor post.

In one embodiment, keys 412–414 correspond to the cursor, such as the keys on a three-button mouse. Key 412 is cursor key 1, key 413 is cursor key 2, and key 414 is cursor key 3. This enables the user to move the cursor with the cursor control, and then "click" on objects or areas by using the cursor keys. For example, in word processing, letters and/or words may be block selected with a combination of cursor control and cursor key interaction in much the same way it is accomplished with a mouse.

In one embodiment, keypad 410 is intended to be used with keypad 401 when keypad 401 is a twelve-key chording keyboard, such as that of FIG. 1. Keypad 401 is not limited to being a twelve-key chording keyboard. In one embodiment, keypad 401 and keypad 410 are located on a distal side (the side facing away from a user) of a keyboard device. The examples and explanations given below for FIG. 4 assume that keypad 401 is a twelve-key chording keyboard. Keypad 401 and keypad 410 are not limited to being physically attached. In one embodiment, keypad 401 and keypad 410 are located in separate apparatuses that operate together as one keyboard.

In one embodiment, keys 417–419 activate various functional states. For example, in one embodiment, keys on the keyboard can be configured to produce the Option, Command, Control, and/or Alt functions found on standard QWERTY keyboards. In one embodiment, pressing key 419 activates function 1. Function 1 enables the top three rows of keypad 401 to represent F1–F9. The orientation could follow, for example, the position of the numeric keys of keypad 401, such that the key that produces "1" would produce F1, the key that produces "2" would produce F2, and so on. The middle key on the bottom row represents F10, key 415 on keypad 410 represents F11, and key 416 on keypad 410 represents F12.

In one embodiment, pressing key 418 activates function 2, a user programming function. User programming creates user-defined function, for example, a special character of symbol, such as "©", that is not specifically represented by the keyboard. The top three rows of keypad 401, as well as the middle key of the bottom row of keypad 401, and keys 415 and 416 can be programmed to provide user-defined functions when pressed after key 418. The user-defined functions are programmed by pressing key 417, key 418, and key 419 simultaneously, then pressing key 418, and then pressing one of the programmable keys and providing a function for it. Once programmed, the user-specified functions are activated by pressing key 418 and then the programmed key. Similarly, a combination press of keys 419 and 418 allows a user to define a second set of programming for the same programmable keys. Once programmed, pressing keys 419 and 418, and then the programmed key activates the second set of user-defined functions.

In one embodiment, pressing key 417 activates user-defined macros. A macro can be, for example, a commonly used word or expression, such as a company name, for which a user wants a shortcut. User-defined macros are stored by pressing key 419, 418, and 417 simultaneously, then pressing key 417, and then a key on keypad 401, or keys 415 or 416 and entering the macro. The macro is produced by pressing key 417 and then the programmed key. In one embodiment, pressing keys 417 and 418 simultaneously activates a predefined "month" macro. After pressing keys 417 and 418, pressing the key at coordinate (0,0) produces "January", the key at coordinate (1,0) produces "February", and so forth. The middle key of the bottom row (coordinate (1,3)) produces "October", key 415 produces "November", and key 416 produces "December".

Figure 5A:
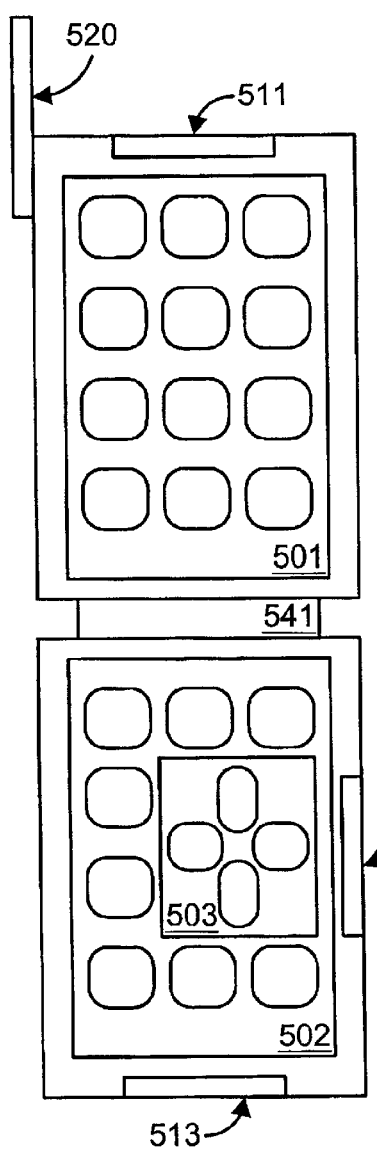
FIG. 5A is one embodiment of a distal side of a standalone data input device incorporating and alphanumeric keypad and a control function keypad.
Figure 5B:
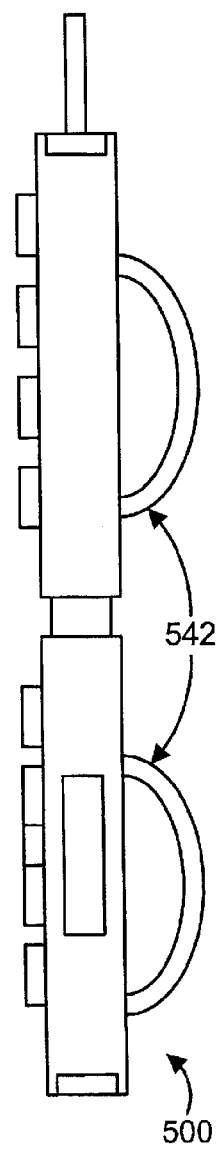
FIG. 5B is one embodiment of a lateral side of a standalone data input device incorporating and alphanumeric keypad and a control function keypad.
Figure 5C:
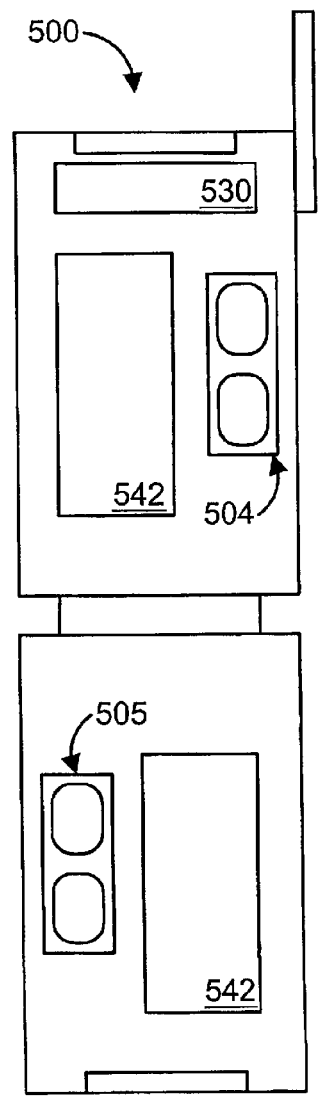
FIG. 5C is one embodiment of a proximal side of a standalone data input device incorporating and alphanumeric keypad and a control function keypad.

FIG. 5A is one embodiment of a distal side of a standalone data input device incorporating an alphanumeric keypad and a control function keypad. FIG. 5B is one embodiment of a lateral side of the device. FIG. 5C is one embodiment of a proximal side of the device. This key orientation of this device can be referred to as a "clarinet keyboard," because it encompasses functions of a normal keyboard, as well as functions of a musical instrument, such as a clarinet. Specifically, like a typical QWERTY keyboard, device 500 provides for alphanumeric input, as well as cursor control. Like a clarinet, where chording is used to produce many of the musical notes, device 500 produces many characters by chorded key presses. Also like a clarinet, device 500 is intended to be held with one hand to operate the upper portion, and the other hand to operate the lower portion of device 500. Device 500 may be, for example, a self-contained note-taker or a standalone keyboard that can be used with an electronic system capable of receiving alphanumeric and/or control input.

Input device 500 contains keypad 501. In one embodiment, keypad 501 includes a twelve-key chording keyboard as described above. In one embodiment, keypad 502 includes a control function keypad such as keypad 402 of FIG. 4. The configuration shown in FIG. 5 is primarily intended for use in a hand position consistent with that of a clarinet, where the left hand operates keypad 501 and the right hand operates keypad 502.

The portion of the housing containing keypad 501 is connected to the portion of the housing containing keypad 502. In one embodiment, keypad 501 and keypad 502 are substantially vertically aligned, with keypad 501 occupying the upper portion, and keypad 502 the lower portion of input device 500. The portion containing keypad 501 and the portion containing of keypad 502 are connected by connecting mechanism 541. In one embodiment, connecting mechanism 541 allows horizontal rotary motion between the two portions of the housing. Thus, for example, connecting mechanism 541 can provide clockwise horizontal rotary motion of the portion containing keypad 501 with respect to the portion containing keypad 502, to provide a more ergonomic configuration for input device 500. In an alternate embodiment, connecting mechanism 541 does not provide horizontal rotary motion, or it makes the portion of housing containing keypad 501 and the portion of housing containing keypad 502 a continuous piece of housing.

In one embodiment, input device 500 contains keypad 504 and keypad 505. Keypad 504 and keypad 505 allow for button control by a user's thumbs. Input device 500 also contains holding devices 542. In one embodiment, one holding device is used. Holding devices 542 could be, for example, Velcro® straps, plastic hooks, or adjustable straps.

Input device 500 may also contain at least one device for external connection to another electronic device. For example, in one embodiment, input device 500 contains antenna 520 to send and receive radio-frequency signals to and from another radio-enabled device. Antenna 520 could be, for example, the antenna of a Bluetooth™ system. In another example, input device contains memory slot 412 to receive a removable memory medium. Memory slot 512 could be a connector to accept, for example, a memory stick, a flash card, or other form of relatively small, interchangeable storage device. In another example, input device 500 contains cable connector 513. Cable connector 513 could be, for example, a connector that ends in an IBM standard PS/2 (Personal System 2) adapter to plug input device 500 into a standard keyboard outlet. Cable connector 513 could also be a connector compatible with USB (Universal Serial Bus), Apple Computer, Inc.'s Firewire, or another peripheral device connection.

Input device 500 may be used as a standalone data input device. For example, device 500 may be a self-contained note-taker, part of a handheld or wearable computer, or a data communication device. Thus, it could store data for later transfer for storage or printing, or it could transmit and receive alphanumeric data Input device 500 may also be used as a component of a system capable of receiving data and/or control input. For example, device 500 could be a keyboard for a desktop or laptop electronic system such as a computer, gaming console, or Web-browsing terminal. Thus, device 500 could transmit data and/or control input to the system via a wired or wireless connection.

Figure 6A:
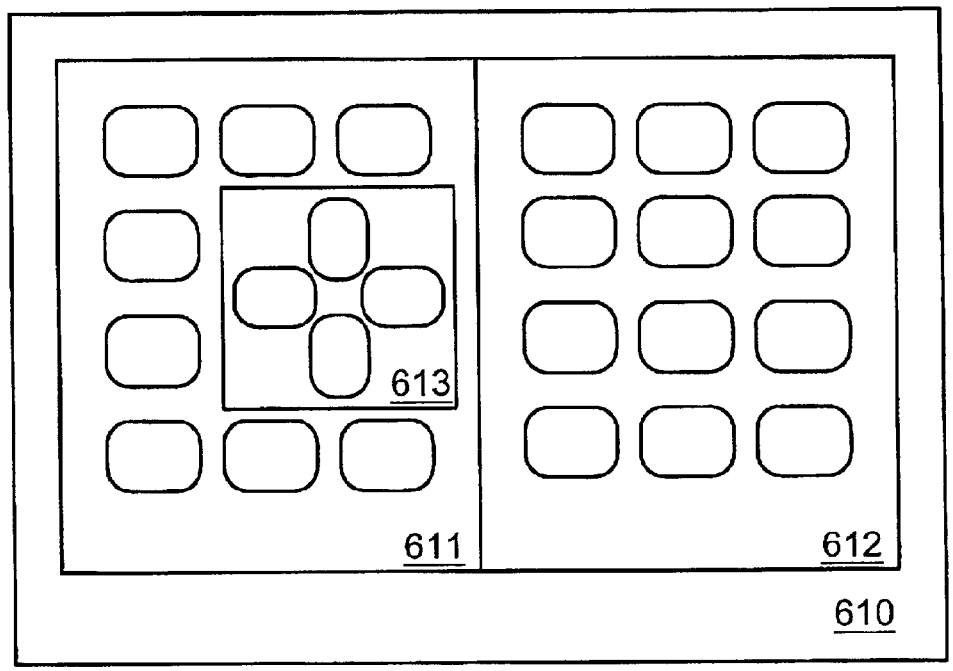
FIG. 6A is another embodiment of a data input device configuration utilizing one hand for alphanumeric data input and the other hand for control function input.
Figure 6B:
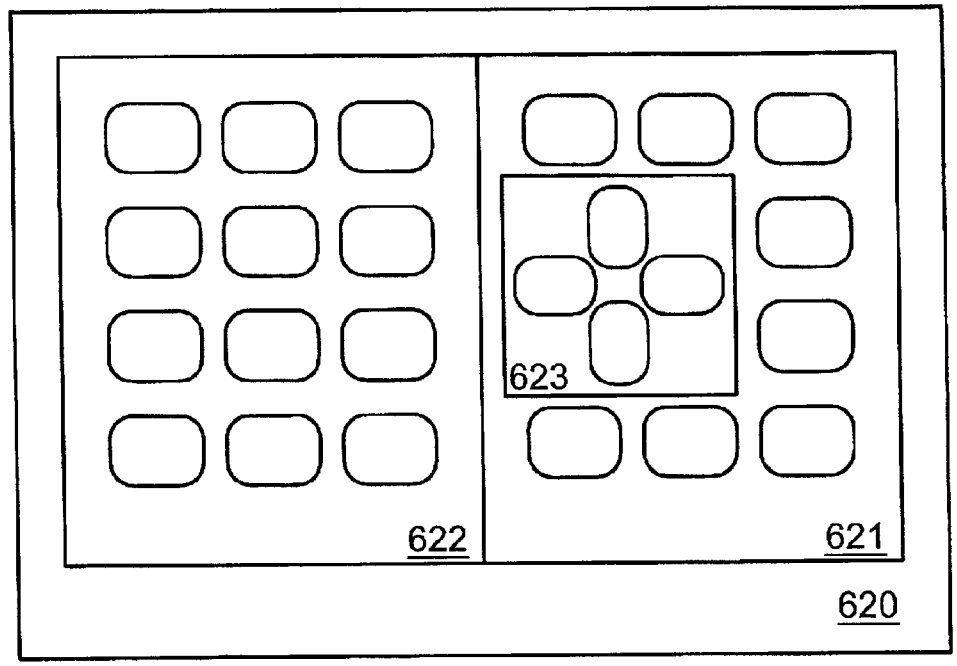
FIG. 6B is another embodiment of a data input device configuration utilizing one hand for alphanumeric data input and the other hand for control function input.

FIG. 6A is one embodiment of a data input device configuration utilizing one hand for alphanumeric data input and the other hand for control function input. FIG. 6B is another embodiment of a data input device configuration utilizing one hand for alphanumeric data input and the other hand for control function input. In one embodiment, data input device 610 contains keypads 611 and 612. In one embodiment, keypad 612 comprises a twelve-key chording keyboard configuration to allow alphanumeric character input. The key configuration of keypad 612 may be selected by frequency of use. Keypad 611 and keypad 612 are not limited to being physically attached. In one embodiment, keypad 611 and keypad 612 are located in separate physical apparatuses that together make up data input device 610.

In one embodiment, keypad 611 comprises control functionality similar to keypad 410 of FIG. 4, with function keys and cursor control. Keypad 611 contains cursor control 613. In one embodiment, cursor control 613 comprises direction keys to control cursor movement. For example, one key to move the cursor to the left, one to the right, one up, and one down. A combination of keys could produce diagonal motion of the cursor. In an alternate embodiment, cursor control 613 comprises a round composite key that controls cursor movement based on what part of the edge of the circular key is pressed. Thus, the single key would work in a similar fashion to the four separate keys described above. In alternate embodiments, cursor control 613 comprises a touchpad, a trackball, or a cursor post.

Data input device 620 is substantially similar to data input device 610, providing the same alphanumeric data input and control functionality. However, the configuration of device 620 is a mirror image of the configuration of device 610.

Thus, for example, one configuration could be used primarily for left-handed use, and the mirror image primarily for right-handed use.

Input device 610 and input device 620 can be incorporated into an electronic device, and thus provide fill keyboard and cursor control functionality. The electronic device could be a PDA, handheld computer, or other compact electronic system. For example, device 610 may be disposed on the distal side (the side opposite the display) of a PDA. This could allow a user to operate keypad 612 with the left hand to provide alphanumeric input, and to operate keypad 611 with the right hand to provide cursor control. Likewise, device 620 may be disposed on the distal side of a PDA to allow right-handed alphanumeric input and left-handed cursor control.

Figure 7:
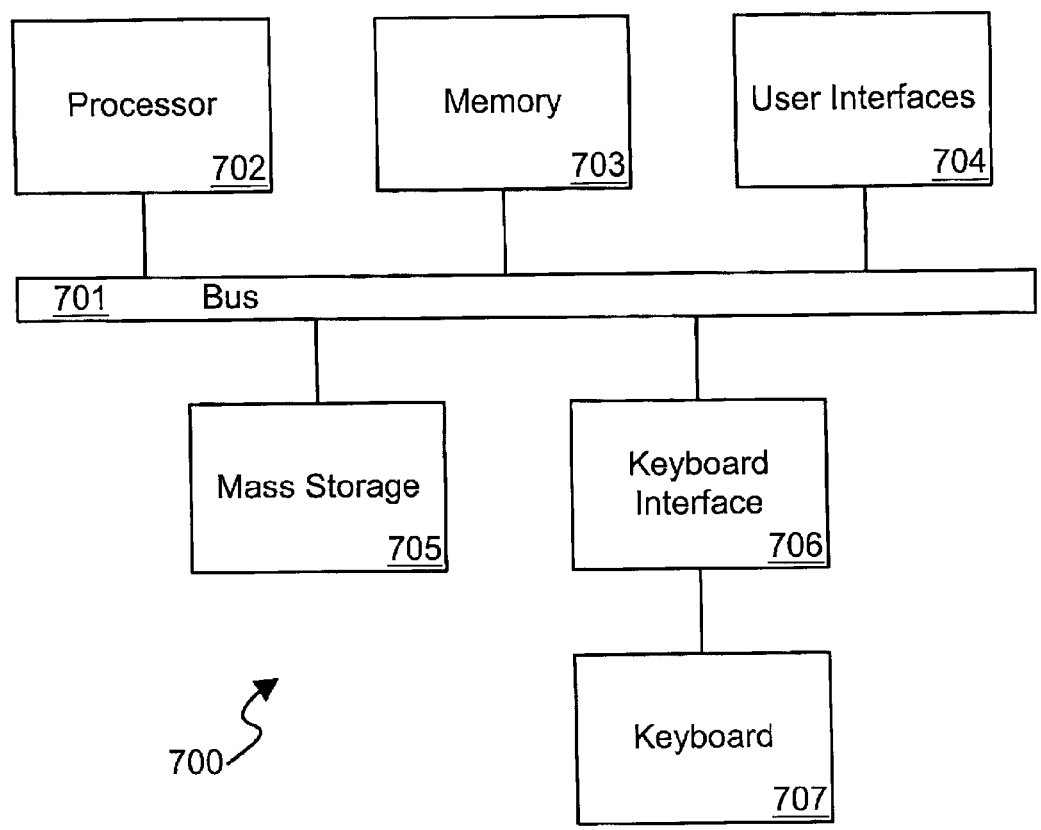
FIG. 7 is one embodiment of a block diagram of an electronic system capable of receiving alphanumeric input from a keyboard.

FIG. 7 is one embodiment of an electronic system capable of receiving alphanumeric input. Electronic system 700 may be, for example, a computer, a Personal Digital Assistant (PDA), a text-messaging cell phone, or other electronic system. System 700 includes bus 701 or other communication device to communicate information, and processor 702 coupled with bus 701 to process data and to execute instructions. System 700 also includes memory 703, coupled to bus 701 to store data, instructions, and/or temporary information for use by processor 702. Memory 703 may include random access memory (RAM), read-only memory (ROM), flash, or other static or dynamic storage media.

User interfaces 704 are coupled to bus 701 to allow interaction with a user. User interfaces 704 can be, for example, input devices (e.g., touchpad, remote, keypad, etc.) and/or output devices (e.g., cathode ray tube (CRT) monitor, liquid crystal display (LCD), etc.). Mass storage 705 is a storage apparatus coupled to system 700 to provide instructions to memory 703. For example, mass storage 705 may be a magnetic disk, a CD-ROM, a DVD, EPROM, EEPROM, a magnetic or optical card, a flash memory, a memory stick, etc. In one embodiment, mass storage 705 can receive data input from a memory stick or card such as that used by the device in FIG. 5.

In one embodiment, system 700 contains keyboard 707 coupled to bus 101 via keyboard interface 706. Keyboard 707 is another example of a user interface input device. In one embodiment, keyboard 707 is a distal chording keyboard as described above. Through it a user can provide alphanumeric input, such as letters and numerals, as well as control functionality input, such as cursor control, Caps Lock, etc.

Keyboard 707 includes a mechanical portion for a user to provide keystrokes and a keystroke interpretation circuit. The mechanical portion could include, for example, twelve-button keypad looking in appearance very similar to that found on a cell phone. The keystroke interpretation circuit could include, for example, a microprocessor. Thus, a user would input a series of keystrokes, and the interpretation circuit would generate standard signals corresponding to the alphanumeric and/or control function input produced by the key press or key presses. These signals would then be transmitted by keyboard 707 to keyboard interface 706.

Keyboard interface 706 may include any technology known in the art to transmit to system 700 the data input produced by keyboard 707. For example, keyboard interface 706 may be a wired system using standard keyboard wiring, or another wiring system. In another example, keyboard interface 706 may be a wireless system such as a radio frequency (RF) or infrared (IR) system. A wireless system includes a transmitter and a receiver. For example, keyboard interface 706 could employ a Bluetooth transmitter at keyboard 707 and a Bluetooth™ receiver at system 700.

The foregoing description includes references to details by way of example and explanation. These details should not be interpreted as limiting the scope of the invention, which is subsequently set forth in the claims. One skilled in the art will appreciate that not all possible embodiments of the invention have been presented, but many alterations and/or modifications could be made.

What is claimed is:

1. A data input device comprising:
   a first plurality of keys disposed within a first portion of a housing on a first side, such that when a user's thumb is placed on a second side, the user's remaining fingers can be placed on one or more of the first plurality of keys, the first plurality of keys to provide alphanumeric character input, wherein the fist plurality of keys provide input of a first set of alphanumeric characters in response to a single keystroke and input of a second set of alphanumeric characters in response to multiple keystrokes; and
   a second plurality of keys disposed within a second portion of the housing on the first side and substantially aligned with the first plurality of keys, the second plurality of keys to provide control functionality.

2. The data input device of claim 1 wherein the first plurality of keys disposed within the first portion of the housing comprises nine keys disposed within the housing to provide alphanumeric input.

3. The data input device of claim 1 wherein the first set of alphanumeric character comprises "e", "t", "a", "o", and "h".

4. The data input device of claim 1 wherein the first set of alphanumeric character comprises "n", "i", "s", and "r".

5. The data input device of claim 1 where the second set of alphanumeric characters comprises "m", "p", "d", and "b".

6. The data input device of claim 1 wherein the first set of alphanumeric characters comprises "shift" and "number lock" keys.

7. The data input device of claim 1 wherein the first set of alphanumeric characters is selected based on frequency of use of the corresponding character.

8. The data input device of claim 1 wherein the second plurality of key is substantially vertically aligned with the first plurality of keys.

9. The data input device of claim 8 wherein switching mechanism alters the key configuration of the first and second plurality of keys such that keystrokes in the altered configuration produce different alphanumeric input similar keystrokes in the pre-altered configuration.

10. The data input device of claim 9 wherein the key configuration in the altered configuration is a mirror-image of the pre-altered configuration.

11. The data input device of claim 1 further comprising a wireless transmitter to transmit keystroke information to another electronic system capable of receiving alphanumeric input.

12. The data in put device of claim 1 wherein the second plurality of keys disposed within the second portion of the housing comprises three keys disposed within the housing to provide control functionality.

13. A data input device comprising:
   a first plurality of keys disposed within a first side of a first housing, such that when a thumb of a first hand of a user is placed on a second side, the user's remaining fingers can be placed on one or more of the first plurality of keys, the first plurality of keys to provide alphanumeric character input, wherein the first plurality of keys provide input of a first set of alphanumeric characters in response to a single keystroke and input of a second set of alphanumeric characters in response to multiple keystrokes; and a second plurality of keys disposed within a first side of a second housing, such that when a thumb of a second hand of a user is placed on a second side, the user's remaining fingers can be placed on one or more of the second plurality of keys, the second plurality of keys to provide control functionality.

14. The data input device of claim 13 wherein the first set of alphanumeric character comprises "e", "t", "a", "o", and "h".

15. The data input device of claim 13 wherein the first set of alphanumeric characters comprises "n", "i", "s", and "r".

16. The data input device of claim 13 wherein the second set of alphanumeric characters comprises "m", "p", "d", and "b".

17. The data input device of claim 13 further comprising a wireless transmitter to transmit keystroke information to another electronic system capable of receiving alphanumeric input.

\* \* \* \* \*